United States Patent
Schierling

(10) Patent No.: US 7,652,585 B2
(45) Date of Patent: Jan. 26, 2010

(54) METHOD AND DEVICE FOR DETECTING A DEGREE OF POLLUTION OF AN OPERATIONAL CONVERTER

(75) Inventor: Hubert Schierling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 477 days.

(21) Appl. No.: 10/599,968

(22) PCT Filed: Apr. 7, 2005

(86) PCT No.: PCT/EP2005/051544
§ 371 (c)(1),
(2), (4) Date: Oct. 16, 2006

(87) PCT Pub. No.: WO2005/101431
PCT Pub. Date: Oct. 27, 2005

(65) Prior Publication Data
US 2008/0272924 A1    Nov. 6, 2008

(30) Foreign Application Priority Data
Apr. 16, 2004   (DE) .................. 10 2004 018 578

(51) Int. Cl.
G08B 17/00 (2006.01)
G08B 21/00 (2006.01)
G01R 27/08 (2006.01)
G01R 17/10 (2006.01)
(52) U.S. Cl. .................. 340/635; 340/584; 340/679; 324/691; 324/706; 324/725
(58) Field of Classification Search .................. None
See application file for complete search history.

(56) References Cited

U.S. PATENT DOCUMENTS

| 4,496,906 A | * | 1/1985 | Clack ........................ 324/439 |
| 5,355,121 A | * | 10/1994 | Naito et al. ................. 340/584 |
| 5,528,226 A | * | 6/1996 | Brown et al. ................ 340/664 |
| 5,553,939 A | | 9/1996 | Dilhac et al. |

(Continued)

FOREIGN PATENT DOCUMENTS

DE    233 205 A1    2/1988

(Continued)

OTHER PUBLICATIONS

Betriebsanleitung: daxxs-OEM Frequenzumrichter 0,5 kW-3,0 kW Copyright © D-Tech GmbH, 1998.

Primary Examiner—Julie Lieu
(74) Attorney, Agent, or Firm—Henry M. Feiereisen; Ursula B. Day

(57) ABSTRACT

A method and a device for detecting the degree of pollution in an operational converter are disclosed. An operating state of at least one of the converter components that is exposed to the ambient air is determined and a corresponding operating state of said component in an unpolluted state is determined. The two operating states are then compared and the calculated comparison value is used as a measurement for the degree of pollution of the converter. Detecting the degree of pollution of an operational converter permits a reduction in the number of breakdowns caused by unprotected operation of a converter, and associated disadvantages such as costs and damage to a company's image.

10 Claims, 2 Drawing Sheets

U.S. PATENT DOCUMENTS

| | | | | |
|---|---|---|---|---|
| 5,650,771 A * | 7/1997 | Lee | | 340/656 |
| 5,757,196 A * | 5/1998 | Wetzel | | 324/688 |
| 7,075,762 B2 * | 7/2006 | Iimura et al. | | 361/18 |
| 7,427,905 B2 * | 9/2008 | Lutz et al. | | 333/186 |
| 2003/0079483 A1 * | 5/2003 | Komatsu et al. | | 62/148 |
| 2003/0214770 A1 | 11/2003 | Schimanek et al. | | |
| 2005/0036271 A1 * | 2/2005 | Yakabe | | 361/329 |
| 2008/0300769 A1 * | 12/2008 | Emery et al. | | 701/103 |

FOREIGN PATENT DOCUMENTS

| | | |
|---|---|---|
| DE | 199 20 401 A1 | 11/1999 |
| DE | 102 54 419 A1 | 12/2003 |
| EP | 0 961 379 A2 | 12/1999 |
| GB | 21714 A | 10/1900 |
| WO | WO 2004/027983 A1 | 4/2004 |

* cited by examiner

METHOD AND DEVICE FOR DETECTING A DEGREE OF POLLUTION OF AN OPERATIONAL CONVERTER

BACKGROUND OF THE INVENTION

The invention relates to a method and a device for detecting a degree of pollution of an operational converter.

When converters, for example frequency converters, are operated in an environment which is polluted but for which they do not have a corresponding protection grade, deposits are formed inside the converter. Since the ambient air of the converter is used as a coolant, the dust particles contained in the ambient air can deposit on surfaces of the converter's components, especially elements to be cooled. For surfaces to be cooled, for example of a heat sink or surfaces of lossy components, these deposits lead to overheating with subsequent failure. Deposits on insulating surfaces can bridge the electrical insulation and therefore endanger the function and safety of the converter.

Whether a converter put on the market is used according to its protection grade can no longer be checked by the manufacturer of this converter. Only when a converter has shut down owing to the occurrence of a fault and technicians open this converter in order to remedy the fault, can it be established whether this converter has been used according to its protection grade. If not, the components of the converter must be covered with deposits. Only then is it established that the cause of the shutdown of the converter is not due to design but due to use. When such a converter is incorporated in a production process, the entire production sometimes has to be interrupted because of the converter which has shut down, which entails significant consequential costs.

SUMMARY OF THE INVENTION

It is therefore an object of the invention to provide a method and a device for detecting a degree of contamination of an operational converter, so that the risk of a protective shutdown of the converter due to pollution can be detected even before an operational interruption.

According to one aspect of the invention, this object is achieved by a method for detecting a degree of pollution of an operational converter, wherein an operating state of at least one of the converter's components which is exposed to the ambient air of the converter is determined, wherein a corresponding operating state of this component in the unpolluted state is determined, and wherein these two operating states are compared with each other and a comparison value thus determined represents a measure of the degree of pollution of the converter.

According to another aspect of the invention, this object is achieved by a method for detecting a degree of pollution of an operational converter, wherein a surface conductance of one of the converter's parts which is exposed to the ambient air of the converter is determined and compared with a predetermined limit value, the comparison value of which represents a measure of the degree of pollution of the converter.

According to yet another aspect of the invention, this object is achieved by a device for detecting a degree of pollution of an operational converter, having a thermal model for estimating a temperature of a heat sink of the converter and having a temperature sensor for determining a heat sink temperature and having an evaluation circuit, which is linked on the input side to the thermal model and the temperature sensor.

According to still another aspect of the invention, this object is achieved by a device for detecting a degree of pollution of an operational converter, having a resistor bridge circuit which is linked on the input side to a voltage supply of the converter and whose resistors are dimensioned so that two diagonally opposite resistors change their resistance by heating as a result of operation, whereas the other two maintain their resistance, and the output of which is linked to an evaluation circuit.

According to still another aspect of the invention, this object is achieved by a device for detecting a degree of pollution of an operational converter, having two conductor tracks extending close to each other, wherein one is provided with a discharge resistor, wherein the other conductor track is linked to a voltage supply of the converter, and wherein a voltage follower is electrically connected in parallel with the discharge resistor.

Since on the one hand an operating state of at least one of the converters components which is exposed to the ambient air of the converter and on the other hand an operating state of this component in the unpolluted state are determined, the degree of pollution of the converter can be deduced by means of a comparison of these two operating states. The comparison value thus determined is a measure of the degree of pollution of the converter.

By means of the second method according to the invention, the degree of pollution of a converter is detected by means of determining a surface conductance of one of the converter's parts which is exposed to the ambient air of the converter and a predetermined limit value. With increasing pollution inside the converter, the surface conductance of one of the converter's parts which is exposed to the ambient air of the converter increases, and therefore the value of a leakage current increases.

In an advantageous embodiment of the method for detecting the degree of pollution, the recorded comparison values are stored. The progress of the pollution of a converter is therefore available for further evaluations. From this progress of the pollution of the converter, for example, a prognosis can be determined for the time of the protective shutdown of the converter. This means that the remaining operating hours of the converter can be displayed, so that a production process can be run down in a controlled way.

In a further advantageous method, a warning signal is generated when a predetermined comparison value is exceeded. In this way, the fact that unperturbed operation is at risk is displayed visually and/or acoustically.

In a further advantageous method a warning message, which reports an imminent protective shutdown of the converter, is generated when a second predetermined comparison value, which is greater than the first comparison value, is exceeded. This second comparison value is predetermined so that it is still possible to suspend the production process.

Components of the converter, whose power loss and/or temperature can be determined, are advantageously employed for diagnosing the pollution of the converter. The heat sink of the converter, on which the power semiconductors of the converter are fitted in a thermally conductive way, is particularly suitable for diagnosing the pollution of the converter. The temperature of the heat sink is recorded in order to monitor the power part of the converter. When a limit value is exceeded, the converter is shut down.

A first device according to the invention for detecting a degree of pollution of an operational converter has a thermal model for estimating a temperature of a heat sink of the converter, a temperature sensor for determining a heat sink temperature and an evaluation circuit, which is linked on the input side to the thermal model and the temperature sensor. In this way a degree of pollution of an operational converter can be diagnosed with few components, some of which are already present in the commercially available converter.

In a second device according to the invention for detecting a degree of pollution of an operational converter, a resistor bridge circuit is used which is linked on the input side to a voltage supply of the converter and whose resistors are dimensioned so that two diagonally opposite resistors change their resistance by heating as a result of operation, whereas the other two maintain their resistance, and the output of which is linked to an evaluation circuit.

Advantageously, at least one resistor of the two resistors which change their resistance as a result of operation consists of a plurality of electrical resistors connected in series, which are arranged distributed in the converter. In this way, the pollution of the converter is detected not only at one predetermined position but inside the entire converter.

A third device according to the invention consists of the measurement of surface conductance. To this end this device comprises two conductor tracks extending close to each other, one of which is connected to a discharge resistor, in parallel with which a voltage follower is connected. The second conductor track is linked to a voltage supply of the converter. A measurement voltage is provided at the output of the voltage follower, the amplitude of which is proportional to a diagnosed degree of pollution of the converter.

With these methods and devices according to the invention, it is possible to reduce the number of failures due to a mode of operation of the converter which is not compliant with the protection grade, and the concomitant disadvantages such as costs and image loss.

BRIEF DESCRIPTION OF THE DRAWINGS

To explain the invention further, reference will be made to the drawing in which several embodiments of the device according to the invention are illustrated schematically.

DETAILED DESCRIPTION OF PREFERRED EMBODIMENTS

Figure 1:
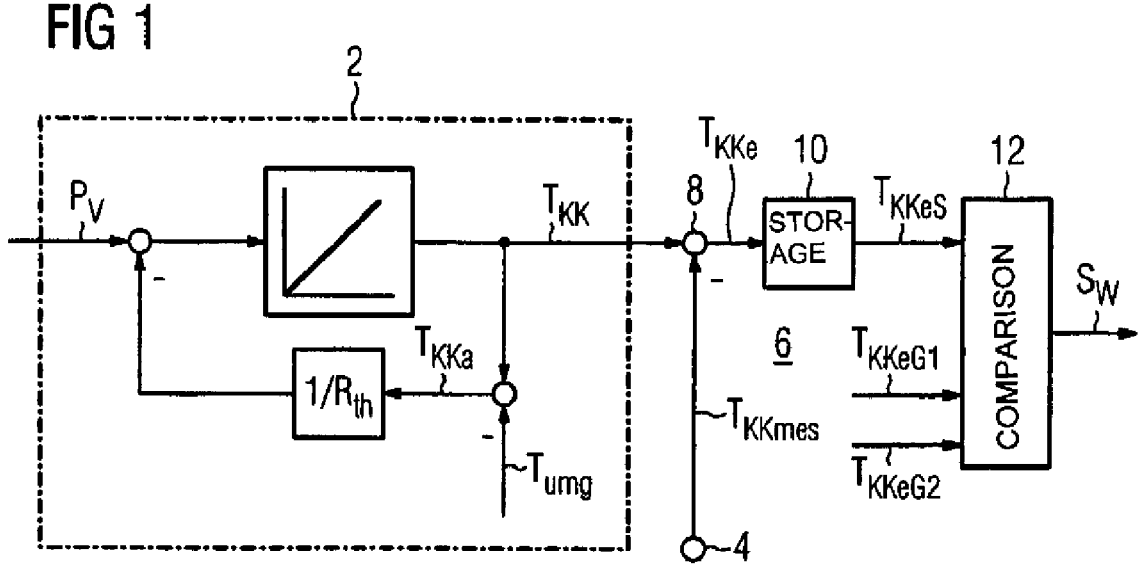
FIG. 1 shows an advantageous embodiment of a first device according to the invention.

An advantageous embodiment of a first device according to the invention is schematically represented in FIG. 1. This device comprises a temperature model 2, a temperature sensor 4 and an evaluation circuit 6. The temperature sensor 4 is placed on the converters component whose temperature is intended to be measured. This component is the heat sink of the converter, which comes directly in contact with the ambient air of the converter. The temperature model 2 is a temperature model which is known per se for the heat sink. With this temperature model, an expected heat sink temperature $T_{KK}$ is determined as a function of an actual power loss $P_V$ and an actual coolant temperature $T_{umg}$. The integration time constant corresponds to the thermal inertia, and the feedback coefficient corresponds to the inverse of the thermal resistance $R_{th}$ of the heat sink. The power loss $P_V$ is determined as in a conventional thermal model, for example for estimating a depletion layer temperature of a power semiconductor, from a load current value, an intermediate circuit voltage value, the phase control factor and a switching frequency. The coolant temperature $T_{umg}$ is determined by means of a further temperature sensor which, for example, is arranged in the coolant flow. As a result, this temperature model 2 of the heat sink delivers an estimated heat sink temperature $T_{KK}$ which the heat sink assumes by dissipating the power loss $P_V$, when it is not polluted.

The evaluation circuit 6 comprises a comparator 8 on the input side, downstream of which a memory 10 is connected. This memory 10 is connected on the output side to a comparison instrument 12, at the output of which a warning signal $S_W$ is provided. Two limit values $T_{KKeG1}$ and $T_{KKeG2}$ for a comparison value $T_{KKe}$ thus determined are furthermore fed to this comparison instrument 12. The memory 10 is needed only so that the time variation of the pollution can also be evaluated. Otherwise, the comparison value $T_{KKe}$ thus determined may also be fed directly to the comparison instrument 12.

When the heat sink of the converter is polluted, the measured heat sink temperature $T_{KKmes}$ is higher than the estimated heat sink temperature $T_{KK}$ Of the temperature model 2. A negative value is obtained as the comparison value $T_{KKe}$. The minus sign signifies that the heat sink of the power part of the converter is operating worse than intended. The value of this comparison value $T_{KKe}$ indicates how much worse this heat sink is operating. Only when the value of this comparison value $T_{KKe}$ thus determined is negative and its magnitude is equal to or greater than the first limit value $T_{KKeG1}$ is a warning signal $S_W$ generated, for example by driving a display. If the magnitude of the comparison value $T_{KKe}$ increases owing to continuous pollution of the heat sink of the power part of the converter, so that it is equal to or greater than a second limit value $T_{KKeG2}$ which is greater than the first limit value $T_{KKeG1}$, then a second warning signal $S_W$ is generated. This warning signal $S_W$ can be used in order to display that a degree of pollution is reached which makes it likely that a protective shutdown will be triggered within the foreseeable future, or an equipment malfunction will occur. By recording these individual comparison values as a function of time, for example, a residual operating time can be calculated. The residual operating time indicates that, under the prevailing operational conditions, the converter will shut down after the indicated time period has elapsed. An acoustic signal may be used in addition to the visual representation.

Figure 2:
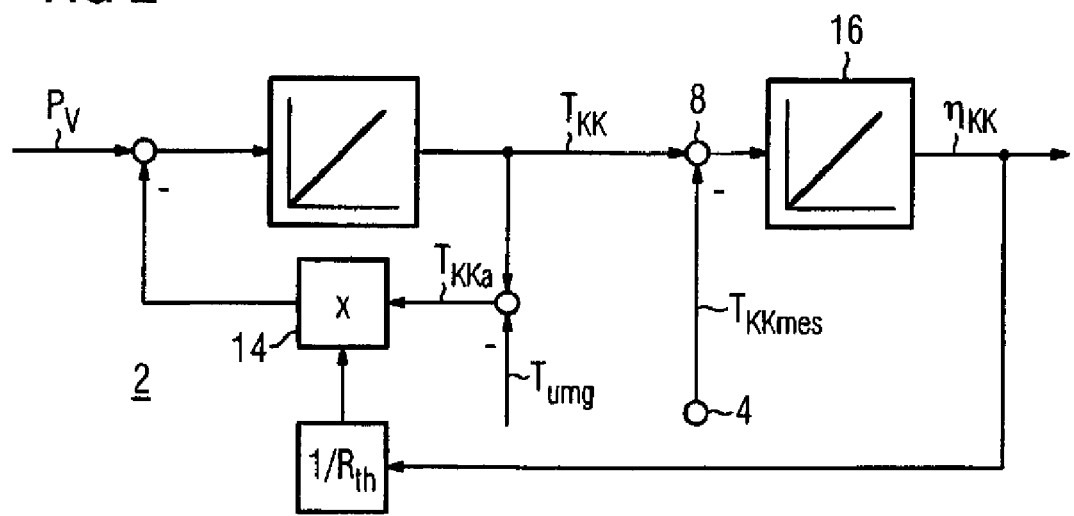
FIG. 2 illustrates a further advantageous embodiment of the first device according to FIG. 1.

FIG. 2 shows a further advantageous embodiment of the first device according to the invention. This embodiment differs from the embodiment according to FIG. 1 in that the temperature model 2 is supplemented with an estimator for the thermal resistance $R_{th}$ of the heat sink. This means that the value of the temperature difference $T_{KKa}$ determined between the heat sink and the coolant is no longer fed directly to the inverse of the thermal resistance $R_{th}$, but instead to a multiplier 14 at the second input of which the inverse of the thermal resistance $R_{th}$ is applied. An integrator 16, which is fed on the output side to the inverse of the thermal resistance $R_{th}$, is furthermore connected downstream of the comparator 8 of the evaluation circuit 6. The value which is obtained at the output of the integrator 16 is the efficiency $\eta_{KK}$ of the heat sink, which is a direct measure of the effectiveness of the cooling system. An efficiency $\eta_{KK}$ less than one means that there is pollution of the heat sink. The difference from $\eta_{KK}=1$ indicates the degree of pollution of the heat sink of the converter. This value for the efficiency $\eta_{KK}$ may be evaluated just like the temperature deviation $T_{KKe}$ which is determined for the heat sink.

Figure 3:
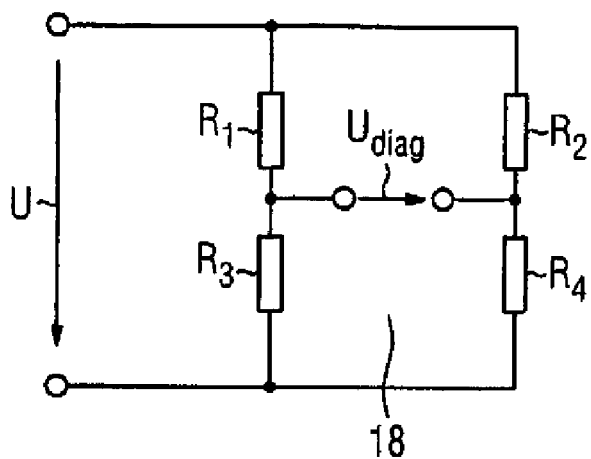
FIG. 3 shows a second device according to the invention.

A second device according to the invention for detecting a degree of pollution of an operational converter is represented in more detail in FIG. 3. This second device according to the invention consists of a resistor bridge circuit 18, which is linked on the input side to a voltage supply U of the converter. This resistor bridge circuit 18 comprises two resistors $R_2$ and $R_3$, which heat up as a result of operation and therefore increase their resistance, and two resistors $R_1$ and $R_4$ which do not change their resistance during operation of the converter. These resistors $R_1$ and $R_4$ either remain at ambient temperature or are made of a material having a temperature-independent resistance. If the resistances of these resistors $R_1$ to $R_4$ are selected so that a bridge diagonal voltage $U_{diag}$ is exactly zero for unpolluted resistors $R_1$ to $R_4$ in the steady state, then this bridge diagonal voltage $U_{diag}$ can be used directly as a measure of any pollution occurring in the operational converter.

In an advantageous embodiment of this device, the resistors $R_2$ and/or $R_3$ consist of a plurality of electrical resistors, which are arranged distributed inside the converter and are electrically connected in series. In this way, the pollution of the operational converter is determined not only at one predetermined position but in the entire converter.

Figure 4:
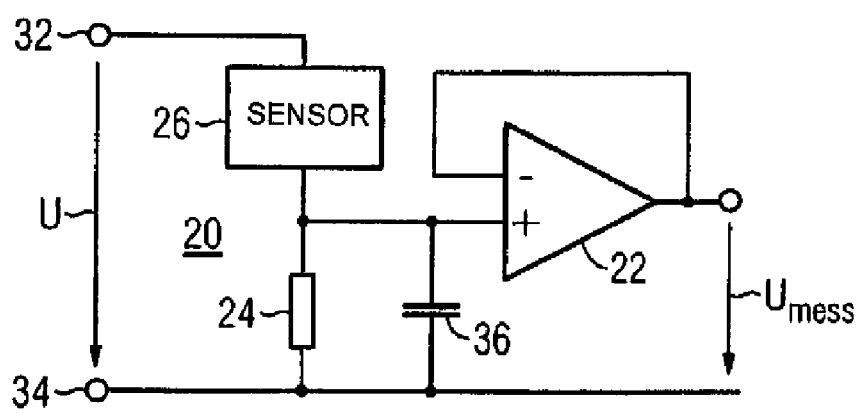
FIG. 4 illustrates a third device according to the invention.
Figure 5:
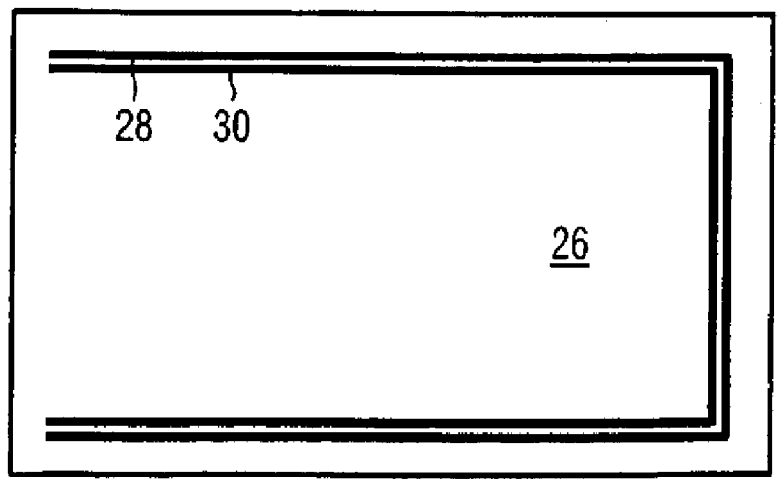
FIG. 5 shows an embodiment of the measuring sensor of the device according to FIG. 4.

A third device for determining a degree of pollution of an operational converter is illustrated in FIG. 4. This device comprises a measuring instrument 20 for the surface conductance and a voltage follower 22. The measuring instrument 20 comprises a discharge resistor 24 and a measuring sensor 26. The measuring sensor 26 used consists of two conductor tracks 28, 30 extending close to each other, for example, which are routed over those circuit board regions of the converter in which the greatest pollution is expected during operation of the converter. This design of this measuring sensor 26 is represented in more detail in FIG. 5. A supply voltage U of the converter is applied to the input terminals 32 and 34 of the measuring instrument 20. The input terminal 32 is connected electrically conductively to the conductor track 28 of the measuring sensor 26, whereas the conductor track 30 is connected to one pole of the discharge resistor 24. The second input terminal 34 of the measuring instrument 20 is linked to the free pole of the discharge resistor 24. So that a leakage current proportional to the pollution of the converter can flow, these two conductor tracks 28 and 30 are free of solder stop resist. A voltage proportional to this is then set up across the discharge resistor 24. This voltage is smoothed by means of a capacitor 36. The voltage follower 22, which is used as an impedance converter, generates from this smoothed voltage a measurement voltage $U_{mes}$ which is proportional to the pollution of the operational converter. Instead of the two conductor tracks 28 and 30 extending close to each other, it is alternatively possible to use solder eyelets which are provided at regular intervals.

With these devices, whose components may be integrated in a converter or sometimes already belong to the converter, the pollution of the converter can be diagnosed straightforwardly during its operation. The risk of equipment malfunctions or failures due to progressive pollution can therefore be detected already before an operational interruption takes place. This reduces the number of failures and the concomitant disadvantages such as costs and image loss.

What is claimed is:

1. A method for detecting a degree of pollution of an operational converter, comprising the steps of:
    determining a surface conductance of a converter part that is exposed to ambient air; and
    determining a comparison value representing a comparison of the surface conductance with a predetermined limit value of the surface conductance, whereby the comparison value thus determined provides a measure of the degree of pollution of the converter.

2. A method for detecting a degree of pollution of an operational converter, comprising the steps of:
    determining an operating state of a converter component that is exposed to the ambient air in the converter;
    determining a corresponding operating state of the converter component in an unpolluted state; and
    determining a comparison value representing a comparison of the two operating states, whereby the comparison value thus determined provides a measure of the degree of pollution of the converter,
    wherein the operating state of the converter component is determined using a resistance of the converter component, said method further comprising the step of displaying the resistance of the converter component.

3. A device for detecting a degree of pollution of an operational converter, said device comprising;
    a thermal model for estimating a temperature of a heat sink of the converter;
    a temperature sensor for determining the temperature of the heat sink; and
    an evaluation circuit connected to the thermal model and to the temperature sensor for comparing the estimated temperature and the determined temperature.

4. A device for detecting a degree of pollution of an operational converter having a voltage supply, said device comprising:
    an evaluation circuit; and
    a resistor bridge circuit having an input side connected to the voltage supply of the converter, two resistors in said resistor bridge circuit that are diagonally opposite to each other being adapted to change their resistance by heating as a result of operation and the other two resistors in said resistor bridge circuit being adapted to maintain their resistance, said resistor bridge circuit having an output connected to said evaluation circuit.

5. A device for detecting a degree of pollution of an operational converter having a voltage supply, said device comprising:
    two conductor tracks extending close to each other, one of said conductor tracks being connected to a discharge resistor, the other conductor track of said conductor tracks being connected to the voltage supply of the converters; and
    a voltage follower connected in parallel with said discharge resistor.

6. The device of claim 4, wherein at least one resistor of the two resistors that are adapted to change their resistance as a result of operation includes a plurality of electrical resistors connected in series, plurality of resistors being arranged in a distributed manner in the converter.

7. The method of claim 1, further comprising the step of storing the comparison value.

8. The method of claim 1, further comprising the step of generating a warning signal when a first predetermined comparison value is exceeded.

9. The method of claim 1, further comprising the step of generating a warning message when a second predetermined comparison value is exceeded, said second predetermined comparison value being greater than said first predetermined comparison value.

10. The method of claim 1, wherein the operating state of the converter component is determined using a resistance of the converter component, said method further comprising the step of displaying the resistance of the converter component.

* * * * *